Patented Apr. 4, 1944

2,345,611

UNITED STATES PATENT OFFICE 2,345,611

PROCESS FOR PLUGGING FORMATIONS

William Bruce Lerch, Clyde H. Mathis, and Eugene J. Gatchell, Bartlesville, Okla., assignors to Phillips Petroleum Company, a corporation of Delaware No Drawing. Application April 7, 1938, Serial No. 200,766

7 Claims. (Cl. 166—22)

This invention relates to a process for the plugging of openings in tanks, walls, dams, etc., plugging formations, particularly those encountered in oil or gas wells and the coating of surfaces.

The invention more particularly relates to the use of a liquid material which, after in place, will undergo condensation, association, polymerization or other chemical reactions to form a resin that will prevent the flow of water, oil and/or gas from or into the formations into which the resinous material has been injected, and generally serve as a sealing agent against flow into or out of tanks, walls, dams and/or from or through any surface whatsoever.

In the drilling of oil and gas wells, water formations are usually encountered during drilling and before the productive oil or gas horizon is contacted. It is required to run steel casing into the well to shut off these water formations but in many instances these waters are corrosive and in contacting the steel casing will soon corrode the same, allowing the encroachment of water into the well. Also after an oil or gas well is completed, bottom hole water may be entering the well bore from the producing formation. This water must be produced from the well bore along with the oil or gas and materially raises the lifting costs to get the oil to the surface of the ground as it cuts down the amount of oil which can be produced and further raises the treating cost of the oil when it arrives on the surface of the ground since the water must be removed from the oil before it can be processed.

The primary object of this invention is to introduce a liquid resin forming material into the formation desired to be plugged in such a manner that the resin by condensation, association, polymerization or other chemical reaction will be formed thereby plugging the channels in the water bearing formation and prevent water from coming into contact with the casing when it is run into the well or entirely eliminating the need for running casing by plugging a water bearing formation.

A further object of this invention is to provide a process for the sealing of tank bottoms, walls, dam faces, etc., by placing a liquid resin forming material on the surface in such manner that the resin by condensation, association, polymerization or other chemical reaction will be formed thereon.

Other objects and advantages will appear to those skilled in the art from a careful study of the description to follow.

The resins which are suitable for carrying out the objects of this invention can be either liquid or solid and are usually the products of condensation or polymerization reactions. The products which the invention is concerned with are those resins that will be solid material at the temperature of the formation or surface that is to be made impermeable. The resins should further be insoluble and chemically inert in water, brine and acid solutions. Among the resins found most suitable for carrying forward the objects of the present invention are the reaction products of an aldehyde or ketones with thiophenols, thiocresols, phenols, cresols, urea, thiourea or phthalic anhydride using a catalyst which may either be alkaline or acid.

The liquid resin materials applicable to this invention may be composed of furfural and carbon disulfide, phenol, urea, thiourea, thio-cresols, thiophenols, or derivatives of these compounds in the presence of a catalyst, either a mineral acid, salts of a weak base and strong acid such as ammonium chloride or alkali, in aqueous solution or other suitable solvents such as acetone, alcohol, glycerol or carbon tetrachloride if greater weight is desired. Other catalysts may be used particularly when the active components of the solution are in an anhydrous solvent. Catalysts such as sulfur monochloride, thionyl chloride or other compounds having hydrochloric acid in equilibrium or yielding hydrochloric acid on hydrolysis will cause the liquid to resinify. If a catalyst of corrosive nature is employed, satisfactory inhibitors may be added to the liquid without interference to the resin forming action.

Illustrations of the practice of the invention are set forth in the following examples:

A liquid resin forming material applicable to plugging underground formations in oil wells or coating surfaces may be composed of three parts thiourea, three parts water, three and one-half parts concentrated hydrochloric acid (sp. gr. 1.19) and six parts of furfural. This liquid mixture forms a very hard black resin which is insoluble in hydrocarbons, water, alcohol, acetone, hydrochloric acid and/or alkali. The setting time is thirty minutes at 150° F. and at room temperature it is too viscous to pump after four hours. The components of the mixture may be varied in wide limits thus controlling the time of set in this manner. It is more desirable to keep the other components approximately in the proportion mentioned and vary the amount of catalyst to control the setting time. When the resin forming material mentioned is mixed with crude oil, brine, or liquid hydrocarbons and permitted to stand, the resin settles to the bottom and forms a very hard mass. The material has the advantage of having a greater specific gravity than most oil field brines while the solution forms a very solid, nonporous plugging agent in the presence of crude oil, brine, or liquid hydrocarbons.

The same mixture as above set forth with the addition of 30% of 95% denatured alcohol increases the setting time to six hours at room temperature, but the resulting resin is not as dense or compact as the original where the alcohol had not been added while the specific gravity is also less.

A liquid resin forming material formed from 3 parts thiourea, 6 parts furfural, 3 parts water and 3 parts 5.4% hydrochloric acid forms a very hard mass within thirty minutes at 180° F. while at room temperature the material remains liquid for over two days.

A liquid resin forming material formed from 5 parts furfural, 5 parts mixed cresols and 3 parts of 4% sulfur monochloride in carbon tetrachloride solution, forms a rubber-like resin which has desirable characteristics. If desired, a liquid resin forming material consisting of addition of suitable proportions of muds, aquagel, carbon black, sulfur, or any suitable filler may be prepared to make a more economical resin, where such addition will not interfere with desired characteristics of the finished resins. Equal portions of the filler to the liquid resin forming material is a very suitable mixture.

According to the preferred embodiment of this invention, resins quite suitable for plugging formations may be formed from furfural, caustic oil and a catalyst. Caustic oil is a product obtained from the caustic wash of the cracked distillate produced in crude oil refineries, processing particular types of crude oil, such as the caustic oil produced at the Alamo Refinery of Phillips Petroleum Company located at Borger, Texas. The exact quantitative analysis of caustic oil is not known but the principal components are thiophenols, thiocresols, phenols, cresols, and mixtures of other sulphur compounds. At present this caustic oil material is a worthless product and is discarded. The catalyst used may be hydrochloric acid, sulfur monochloride, ferric chloride, or other materials that will yield hydrochloric acid on hydrolysis or contain hydrochloric acid in equilibrium. Hydrochloric acid is the most suitable catalyst because of its availablility and since it is a water solution, fewer mixing difficulties are presented. The setting time is very well controlled by the amount of catalyst used. In mixing these resins a maximum temperature of 120° F. and a minimum temperature of 100° F. is preferred, however these temperatures are given only as examples and are not to be interpreted as limiting the temperature range at which the product may be prepared.

Experimentation has shown that the best ratio of furfural and caustic oil is: furfural, 25 parts; caustic oil, 75 parts. This is the ratio which the reaction seems to indicate gives the best results and it is also more economical to use as little furfural as possible since its cost is greater than the caustic oil. However, when a greater specific gravity is desired, the amount of furfural may be increased up to 50% of the solution. The components of the liquid material may be varied within wide limits and still form a resin so that, any resin, from these components is to be considered within the scope of this invention.

When the resin is formed from a 75 to 25 ratio of caustic oil and furfural, sufficient stirring is required. It is desirable to use efficient agitation for a time varying between one and four hours. The stirring time may be shortened by the addition of emulsifying agents such as glue, egg albumen, gum arabic, gelatin, or other materials capable of dispersing the acid in the furfural-caustic oil mixture. The addition of gum arabic gives a more elastic product while glue or gelatine give a very hard dense product.

The application of the material to the well bore may be directly through the casing, tubing, bailer or any conventional method suitable for lowering the liquid into the well. If necessary, pressure may be applied through the tubing by positive pump action after a wall packer has been set between the tubing and casing above the formation where treatment is desired. After sufficient resin forming material has been added to the formation, a plug of suitable material may be used to separate the resin forming material from the oil or water which will follow in the tubing to drive the resin forming material out into the formation to be plugged and thus insure that the resin forming material will not set up in the tubing. The pressure will be held on the formation until the liquid material has had plenty of time to form a solid impermeable resin, plugging the formation.

The setting time of the resin may be varied to fit the particular application, the governing factors being: the depth or extent of the formation, the permeability, porosity and chemical nature of the formation and the available method of application. The setting time is best controlled by the quantity of catalyst present in the mixture.

In conclusion, our invention specifically relates to the use of liquid resin forming materials with the chemical reaction definitely controlled so as to produce a solid resin within a controlled time limit so as to allow sufficient time to prepare and introduce the liquid resin forming material into a well, tank, or any surface to be treated, before the same resinifies or solidifies. Certain chemical mixtures of materials which will react in this manner have been specifically mentioned but it is to be understood that other compounds or mixtures containing the same physical and chemical properties as those specifically mentioned will react in the same manner as those mentioned and that various changes in the choice and amounts of materials used can be made without departing from the spirit of our invention or the scope of the subjoined claims.

We claim:

1. A method of plugging water formations in wells comprising introducing into the formation a liquid composition which consists of a resinous mixture, said resinous mixture comprising an aldehyde and a compound selected from the group consisting of urea and thiourea, to which has been added a catalyst in sufficient quantity to delay the time of set of the resinous mixture until it is in place in the formation to be sealed, pressuring the resinous mixture into place in the formation and holding the pressure on the resinous mixture until it has polymerized to form a solid resin plug in the formation.

2. A method of plugging water formations in wells comprising introducing into the formation a liquid composition which consists of a resinous mixture, said resinous mixture comprising an aldehyde and thiourea to which has been added a catalyst in sufficient quantity to delay the time of set of the resinous mixture until it is in place in the formation to be sealed, pressuring the resinous mixture into place in the formation and holding the pressure on the resinous mixture until it has polymerized to form a solid resin plug in the formation.

3. A method of plugging water formations in wells comprising introducing into the formation a liquid composition which consists of a resinous mixture, said resinous mixture comprising furfural and thiourea to which has been added a catalyst in sufficient quantity to delay the time of set of the resinous mixture until it is in place in the formation to be sealed, pressuring the resinous mixture into place in the formation and holding the pressure on the resinous mixture until it has polymerized to form a solid resin plug in the formation.

4. A method of plugging water formations in wells comprising introducing into the formation a liquid composition which consists of a resinous mixture, said resinous mixture comprising furfural and thiourea to which has been added an acid catalyst in sufficient quantity to delay the time of set of the resinous mixture until it is in place in the formation to be sealed, pressuring the resinous mixture into place in the formation and holding the pressure on the resinous mixture until it has polymerized to form a solid resin plug in the formation.

5. A method of plugging water formations in wells comprising introducing into the formation a liquid composition which consists of a resinous mixture, said resinous mixture comprising an aldehyde and thiourea to which has been added a hydrochloric acid catalyst in sufficient quantity to delay the time of set of the resinous mixture until it is in place in the formation to be sealed, pressuring the resinous mixture into place in the formation and holding the pressure on the resinous mixture until it has polymerized to form a solid resin plug in the formation.

6. A method of plugging water formations in wells comprising introducing into the formation a liquid composition which consists of a resinous mixture, said resinous mixture comprising furfural and thiourea to which has been added a hydrochloric acid catalyst in sufficient quantity to delay the time of set of the resinous mixture until it is in place in the formation to be sealed, pressuring the resinous mixture into place in the formation and holding the pressure on the resinous mixture until it has polymerized to form a solid resin plug in the formation.

7. A method of plugging water formations in wells comprising introducing into the formation a liquid composition which consists of a resinous mixture, said resinous mixture comprising three parts of thiourea, six parts of furfural, three parts of water and three and one half parts of concentrated hydrochloric acid, pressuring the resinous mixture into place in the formation and holding the pressure on the resinous mixture until it has polymerized to form a solid resin plug in the formation.

WILLIAM BRUCE LERCH.
CLYDE H. MATHIS.
EUGENE J. GATCHELL.